(12) United States Patent
Hamid

(10) Patent No.: US 6,944,321 B2
(45) Date of Patent: Sep. 13, 2005

(54) IMAGE DISTORTION COMPENSATION TECHNIQUE AND APPARATUS

(75) Inventor: Laurence Hamid, Ottawa (CA)

(73) Assignee: Activcard Ireland Limited, Dublin (IE)

( * ) Notice: Subject to any disclaimer, the term of this patent is extended or adjusted under 35 U.S.C. 154(b) by 576 days.

(21) Appl. No.: 10/189,443

(22) Filed: Jul. 8, 2002

(65) Prior Publication Data

US 2003/0086625 A1 May 8, 2003

Related U.S. Application Data

(60) Provisional application No. 60/306,448, filed on Jul. 20, 2001.

(51) Int. Cl.[7] .............................. G06K 9/00; G06K 9/40
(52) U.S. Cl. ....................................... 382/124; 382/275
(58) Field of Search ................................ 382/124, 232, 382/254, 275, 298; 359/17, 30

(56) References Cited

U.S. PATENT DOCUMENTS

| | | | |
|---|---|---|---|
| 4,353,056 A | 10/1982 | Tsikos | |
| 4,784,484 A | 11/1988 | Jensen | |
| 4,832,485 A * | 5/1989 | Bowles | 356/71 |
| 5,109,427 A | 4/1992 | Yang | |
| 5,187,482 A | 2/1993 | Tiemann et al. | |
| 5,187,748 A | 2/1993 | Lee | |
| 5,233,404 A | 8/1993 | Lougheed et al. | |
| 5,325,442 A | 6/1994 | Knapp | |
| 5,778,089 A | 7/1998 | Borza | |
| 5,926,555 A * | 7/1999 | Ort et al. | 382/124 |
| 6,038,043 A * | 3/2000 | Bahuguna et al. | 359/30 |
| 6,134,340 A * | 10/2000 | Hsu et al. | 382/124 |
| 6,466,686 B2 * | 10/2002 | Senior | 382/124 |
| 6,643,390 B1 * | 11/2003 | Clark et al. | 382/124 |
| 2002/0030359 A1 | 3/2002 | Bergenek et al. | |

FOREIGN PATENT DOCUMENTS

| | | |
|---|---|---|
| EP | 0 813 164 A1 | 12/1997 |
| WO | WO 99/63476 A1 | 12/1999 |
| WO | WO 00/36548 A1 | 6/2000 |

* cited by examiner

*Primary Examiner*—Kanjibhai Patel
(74) *Attorney, Agent, or Firm*—Freedman & Associates

(57) ABSTRACT

A method of compensating for distortion within a composite image is disclosed. A biometric surface is sensed with a swipe imager. The images so provided are assembled into a composite image of the biometric surface. The composite image is then adjusted by insertion or deletion of rows therein to result in an image with a different number of rows.

55 Claims, 11 Drawing Sheets

IMAGE DISTORTION COMPENSATION TECHNIQUE AND APPARATUS

This application claims priority from the U.S. Provisional Application No. 60/306,448 filed Jul. 20, 2001.

FIELD OF THE INVENTION

The invention relates generally to contact imagers and more particularly to swipe contact imagers.

BACKGROUND OF THE INVENTION

Biometric techniques for determining the identity of individuals are being used increasingly in authentication, recognition, and/or access systems. These techniques use biometric identifiers or human characteristics to verify or identify an individual. The fact that most human characteristics are unique to each individual, are difficult to reproduce by others, and are easily converted to electronic data, is particularly advantageous in biometric identification applications.

Historically, fingerprints have been the most widely used biometric identifiers, as is evident from law enforcement's extensive use of fingerprinting. The recent trends in biometric identification have been toward automating the above-mentioned authentication, recognition, and/or access systems. Most current techniques rely upon correlation methods that use automated detection systems connected to a computer database, for comparing detected biometric data to biometric data stored in the database, to confirm or determine the identity of an individual. Such automated systems have been used to identify individuals before granting access to cars, computers, home or business offices, hotel rooms, and in general, any sensitive or restricted area.

Various optical devices are known which employ prisms upon which a finger whose print is to be identified is placed. For example, the prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404.

An alternative type of contact imaging device is disclosed in U.S. Pat. No. 4,353,056 in the name of Tsikos issued Oct. 5, 1982, herein incorporated by reference. The imaging device that is described by Tsikos uses a capacitive sensing approach. To this end, the imaging device comprises a two dimensional, row and column, array of capacitors, each comprising a pair of spaced apart electrodes, carried in a sensing member and covered by an insulating film. The sensors rely upon deformation to the sensing member caused by a finger being placed thereon so as to vary locally the spacing between capacitor electrodes, according to the ridge/trough pattern of the fingerprint, and hence, the capacitance of the capacitors.

A further contact imaging device is described in U.S. Pat. No. 5,325,442 in the name of Knapp, issued Jun. 28, 1994, herein incorporated by reference. Knapp discloses a capacitance measuring contact imaging device in the form of a single large active matrix array, formed by the deposition and definition by photolithographic processes of a number of layers on a single large insulating substrate. Electrodes and sets of address conductors formed of metal and field effect transistors are formed as amorphous silicon or polycrystalline silicon thin film transistors (TFTs) using an appropriate substrate of, for example, glass or quartz.

Additionally, a fingerprint sensing device and recognition system that includes an array of closely spaced apart sensing elements, each comprising a sensing electrode and an amplifier circuit, is described in U.S. Pat. No. 5,778,089 in the name of Borza, issued Jul. 7, 1998, herein incorporated by reference.

"Swipe imagers" are also known, wherein an individual places a fingertip into contact with a surface of a contact imaging device and then draws, or "swipes", the fingertip across a sensing portion of the surface. Images from adjacent portions of the fingertip are captured and combined in order to construct a composite image of the fingertip having an area that is greater than the area of a single captured image. In this way, an area of the fingertip that is substantially larger than the sensing portion is imaged. Such an arrangement allows a smaller capacitive fingerprint scanner to be used, which is advantageous due to lower manufacturing costs, improved robustness, and so forth. Also, the small area required is highly advantageous for embedded applications such as with a cell phone, a telephone, a computer (laptop) and so forth. Unfortunately, images acquired with conventional swipe imagers are typically distorted relative to images captured with static imaging techniques.

It is an object of the invention to image a biometric surface using a swipe contact imager and to provide a composite image having less distortion than the raw composite image formed through mere image concatenation.

SUMMARY OF THE INVENTION

In accordance with the invention there is provided a method of compensating for distortion within a composite image comprising the steps of: sensing a biometric surface with a swipe imager to provide sensed data; forming a composite image of the biometric surface from the sensed data; and, adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

In accordance with another aspect of the invention there is provided a swipe contact imager comprising: a platen across which a biometric surface is to be passed for imaging thereof; an imaging circuit for sensing a biometric surface passing across the platen and for providing image data relating to portions thereof; and a processor for forming a composite image from the image data and for adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

In accordance with yet another aspect of the invention there is provided a storage medium having stored therein data, the data indicative of instructions for performing the steps of: sensing a biometric surface with a swipe imager to provide sensed data; forming a composite image of the biometric surface from the sensed data; and, adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

BRIEF DESCRIPTION OF THE DRAWINGS

The invention will now be described with reference to the attached drawings in which:

FIG. 1a is a fingerprint as imaged by a flat contact imager of a non-swipe configuration;

FIG. 1b is same fingerprint as FIG. 1a with heavy pressure applied in an upward swipe direction;

FIG. 1c is the same fingerprint as FIG. 1a with medium pressure applied in an upward swipe direction;

FIG. 1d is the same fingerprint as FIG. 1a with light pressure applied in an upward swipe direction;

FIG. 1e is the same fingerprint as FIG. 1a with heavy pressure applied in an downward swipe direction;

FIG. 1f is the same fingerprint as FIG. 1a with medium pressure applied in an downward swipe direction;

FIG. 1g is the same fingerprint as FIG. 1a with light pressure applied in an downward swipe direction;

DETAILED DESCRIPTION OF EMBODIMENTS OF THE INVENTION

Figure 1:
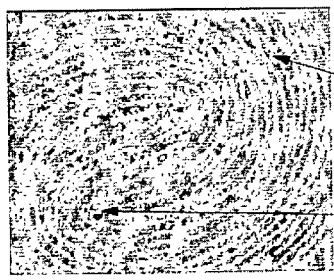
FIG. 1 is a computer generated diagram of a plurality of images of a same fingerprint each acquired with different parameters.
Figure 1:
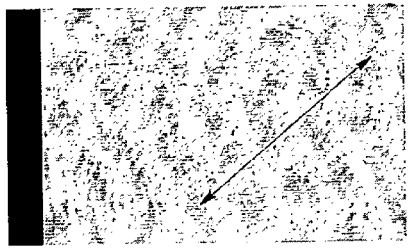
Figure 1:
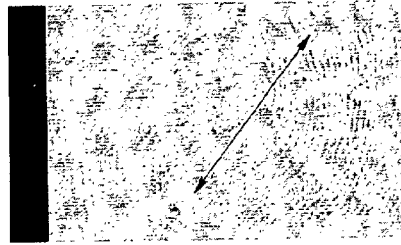
Figure 1:
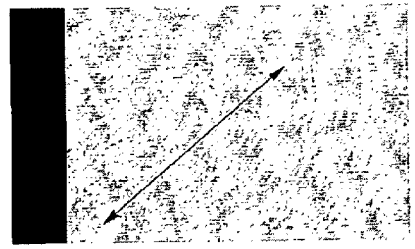
Figure 1:
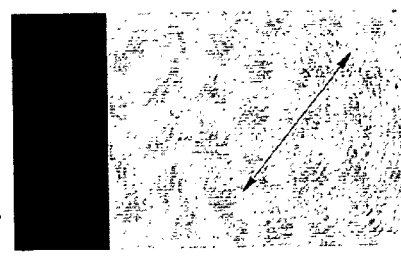
Figure 1:
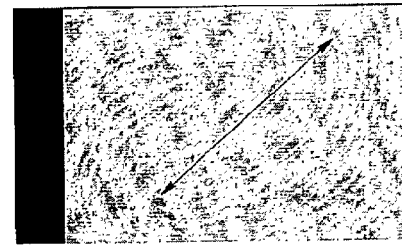

Referring to FIG. 1, a set of computer generated images of a fingerprint are shown. Each is presented upside down as that is how they are stored electronically and, as such, a top of each image is shown at a bottom of each image within the figure. FIG. 1(a) shows the fingerprint as imaged by a flat contact imager of a non-swipe configuration. Such an imager maintains an approximately distortionless relation between features and is used in the description that follows as a reference fingerprint image.

In FIG. 1(b) the same fingerprint is shown reconstructed. The fingertip was swiped in a generally upward direction along the swipe contact imager and during swiping thereof, a heavy pressure was applied by the individual. Thus, the distortion is significant therein causing a stretching of the fingerprint as is noted by the increased distance between the features f1 and f2.

In FIG. 1(c), a same fingerprint is again shown reconstructed. The fingertip was swiped in a generally upward direction along the swipe contact imager and during swiping thereof, a medium pressure was applied by the individual. Thus, the distortion is significant therein causing a stretching of the fingerprint as is noted by the increased distance between the features f1 and f2.

In FIG. 1(d), a same fingerprint is again shown reconstructed. The fingertip was swiped in a generally upward direction along the swipe contact imager and during swiping thereof, a light pressure was applied by the individual. Thus, the distortion is less significant than in either of the two previous images though a stretching of the fingerprint is evident as is noted by the increased distance between the features f1 and f2.

In FIG. 1(e) the same fingerprint is again shown reconstructed. The fingertip was swiped in a generally downward direction along the swipe contact imager and during swiping thereof, a heavy pressure was applied by the individual. Thus, the distortion is significant therein causing a compressing of the fingerprint as is noted by the decreased distance between the features f1 and f2.

In FIG. 1(f), a same fingerprint is again shown reconstructed. The fingertip was swiped in a generally downward direction along the swipe contact imager and during swiping thereof, a medium pressure was applied by the individual. Thus, the distortion is significant therein causing a compressing of the fingerprint as is noted by the decreased distance between the features f1 and f2.

In FIG. 1(g), a same fingerprint is again shown reconstructed. The fingertip was swiped in a generally downward direction along the swipe contact imager and during swiping thereof, a light pressure was applied by the individual. Thus, the distortion is less significant than in either of the two previous images though a compressing of the fingerprint is evident as is noted by the decreased distance between the features f1 and f2.

Of course, for a swipe contact fingerprint imager to be a drop in replacement to existing platen based contact imaging devices, the resulting fingerprint image is preferably as similar as possible to those captured by a non-swipe contact imager. As such, it would be advantageous to transform the image to reduce effects of stretching and compressing visible in reconstructed swipe images.

Table 1 below sets out the effects of distortion. It is observed that swiping a finger upwards causes stretching while swiping a finger downwards causes compression.

Further, the compression in a downward swiped fingertip is more acute near a top of the fingerprint that elsewhere. There is also some horizontal distortion, more so in the upward swipe direction that in the downward swiped fingerprints.

TABLE 1

Distortion Effects Summary

| Type | Dir/Press | Abs($f_{1x}$-$f_{2x}$) | Abs($f_{1y}$-$f_2$) | Abs($f_1$-$f_2$) | Error$_x$ | Error$_y$ | Error |
|---|---|---|---|---|---|---|---|
| Flat | n/a | 129 | 153 | 200 | n/a | n/a | n/a |
| Swipe | Up/Heavy | 147 | 172 | 226 | 14.0% | 12.4% | 13.0% |
| Swipe | Up/Medium | 151 | 188 | 241 | 17.0% | 22.9% | 20.5% |
| Swipe | Up/Light | 150 | 182 | 236 | 16.3% | 19.0% | 18.0% |
| Swipe | Down/Heavy | 151 | 110 | 187 | 17.0% | −28.1% | −6.5% |
| Swipe | Down/Medium | 134 | 112 | 175 | 3.9% | −26.8% | −12.5% |
| Swipe | Down/Light | 140 | 113 | 180 | 8.5% | −26.1% | −10.0% |

Figure 2:
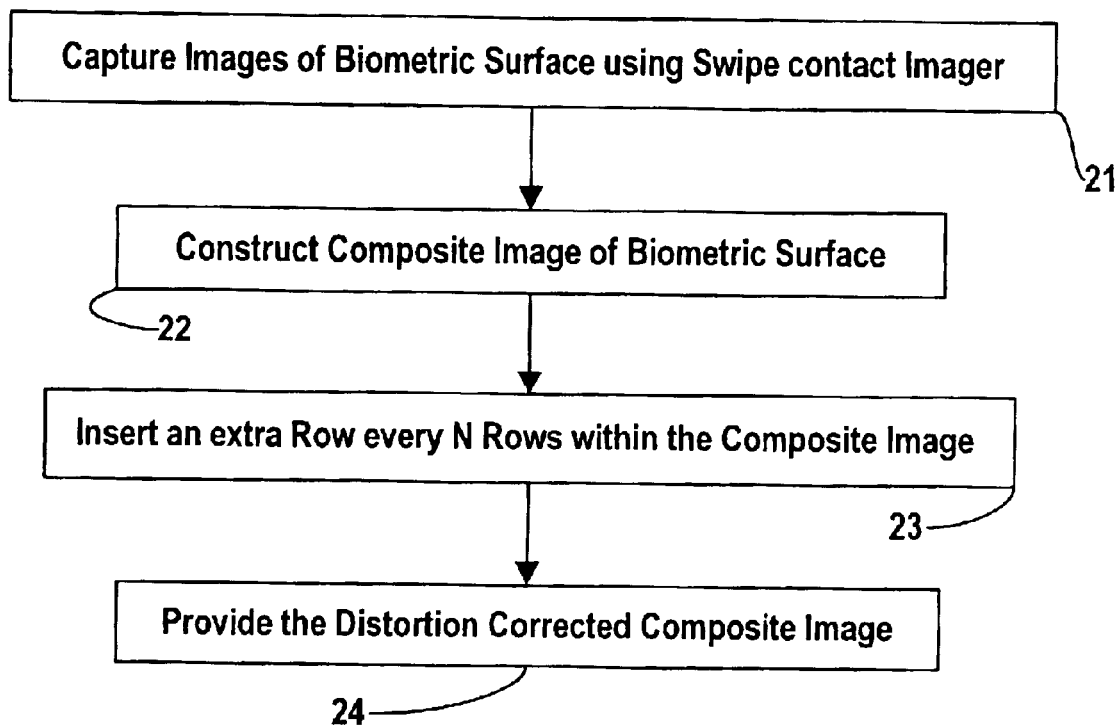
FIG. 2 is a simplified flow diagram of a method of reducing compression related distortion within some of the images of FIG. 1 according to the invention.

Referring to FIG. 2, a simplified flow diagram of a method for correcting vertical distortion in a swipe image captured with a fingertip moving downward across a swipe contact imager is shown. A biometric surface is passed across a swipe contact imager and a plurality of image portions are captured at 21. The image portions are assembled into a composite image at 22.

Once the composite image is constructed, one row is inserted within the image for every N image rows at 23. For example, N=4. Thus, the image is increased in vertical direction. By doing so, the feature spacing along the vertical direction—the y axis—is increased to compensate for compressing of the image occurring during image capture. Finally, the corrected composite image is provided at 24.

Of course, the use of a single fixed row insertion rate is not equally beneficial to each of the images 1(e), (f), and (g) since the compression ratio for each is different. That said, it was found to sufficiently improve the imaging results in general as shown in Table 2 and to therefore be advantageous.

Figure 4:
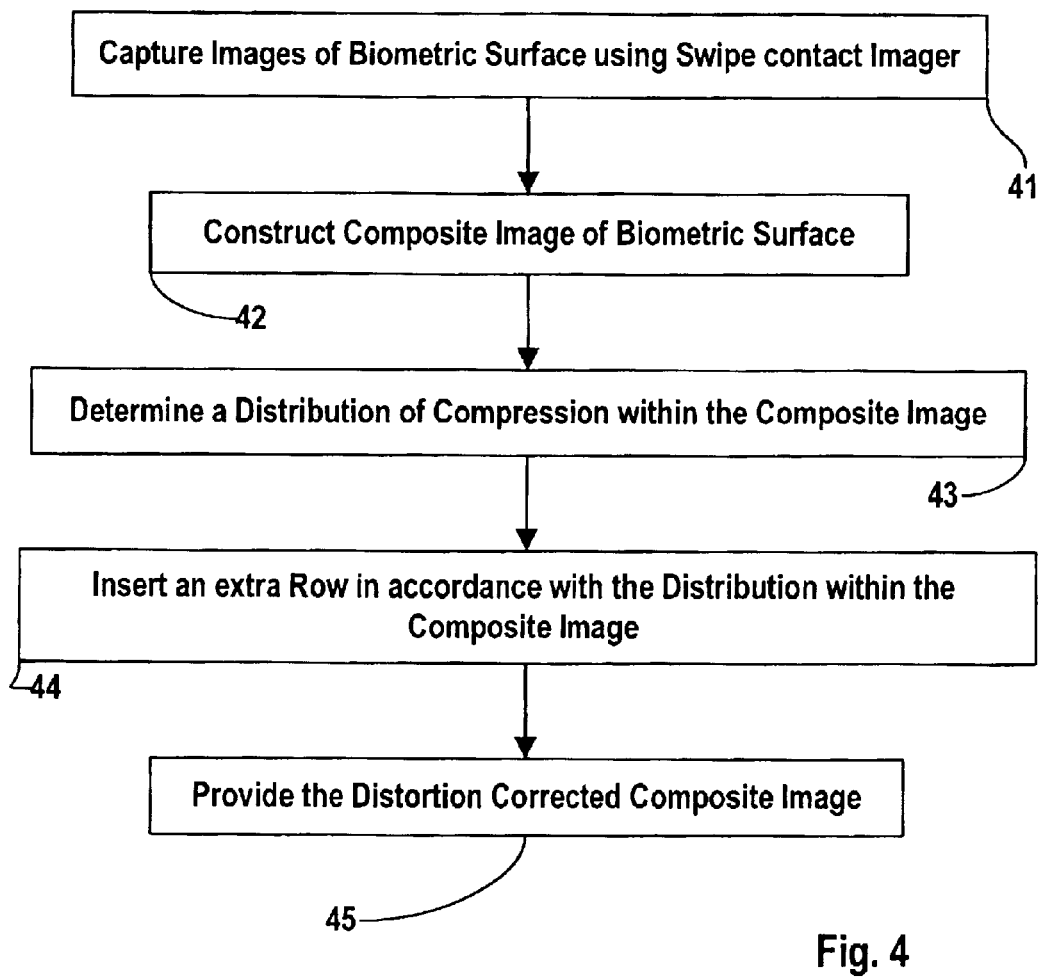
FIG. 4 is a simplified flow diagram of a method of reducing compression related distortion within some of the images of FIG. 1 according to the invention.

Referring to FIG. 4, a simplified flow diagram of a more complicated but generalized method is shown. Here a plurality of image portions is sensed during a downward swipe of a fingertip across an imager. A biometric surface is passed across a swipe contact imager and a plurality of image portions are captured at 41. The image portions are assembled into a composite image at 42.

Once the composite image is constructed, an amount of compression therein is determined. For example, an analysis of the image compared to a known image of the same biometric surface is performed to determine an amount of compression therein. Alternatively, the compression is determined based on a measured force applied during sensing of the image of the biometric surface. The amount of compression is then used with further image analysis to determine a distribution of compression within the image at 43. The distribution may be constant such as 1 in every 4 rows or may be a segmented distribution such as 1 in 3 for the top third and 1 in 5 for the remaining portion of the image. Alternatively, the distribution may be mathematical in nature following a linear or non linear relation with a location within the image.

The determined amount of compression is used to estimate where to insert additional rows within the image. At

TABLE 2

Distortion Correction Summary

| Type | Dir/Press | Abs($f_{1x}$-$f_{2x}$) | Abs($f_{1y}$-$f_2$) | Abs($f_1$-$f_2$) | Error$_x$ | Error$_y$ | Error |
|---|---|---|---|---|---|---|---|
| Flat | n/a | 129 | 153 | 200 | n/a | n/a | n/a |
| Swipe | Down/Heavy | 151 | 158 | 218 | 17.0% | 3.3% | 8.5% |
| Swipe | Down/Medium | 134 | 140 | 194 | 3.9% | −8.5% | −3.2% |
| Swipe | Down/Light | 140 | 141 | 199 | 8.5% | −7.8% | −0.7% |

Figure 3:
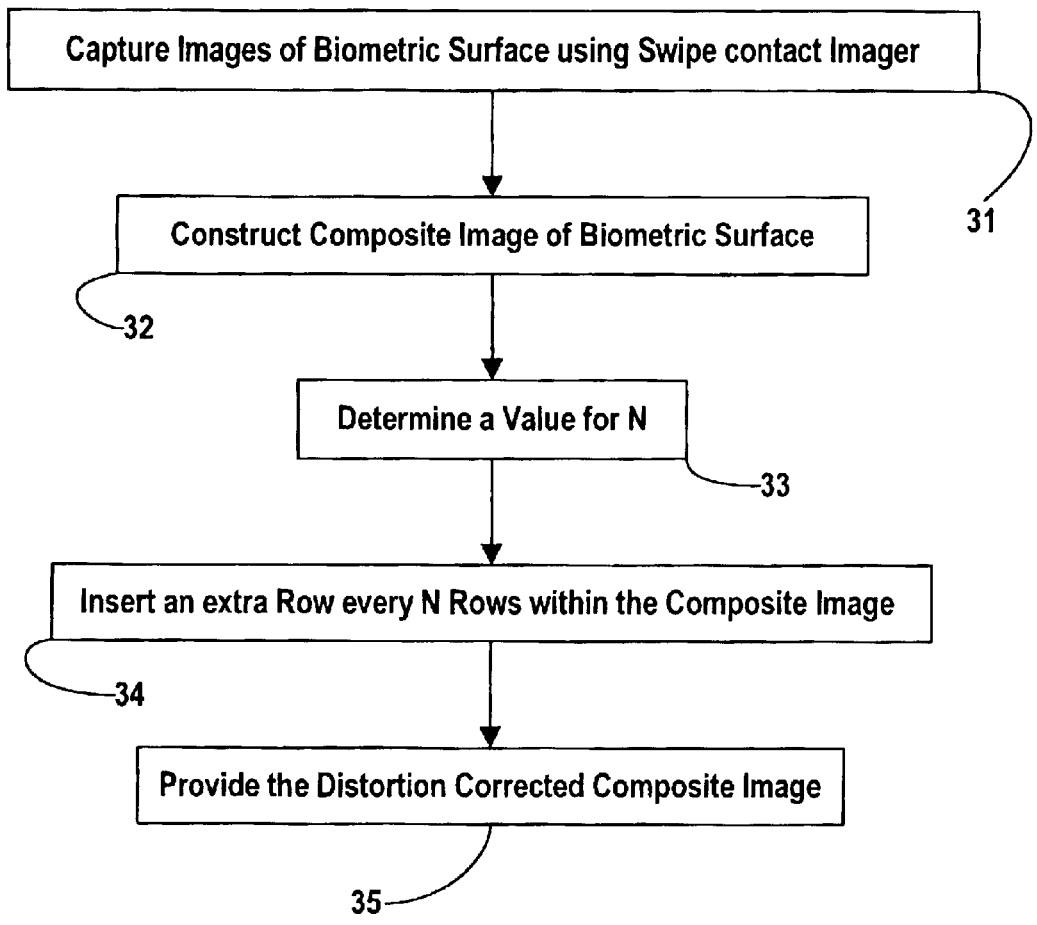
FIG. 3 is a simplified flow diagram of a generalized method of reducing compression related distortion within some of the images of FIG. 1 according to the invention.

Referring to FIG. 3, a simplified flow diagram of a more complicated but generalized method is shown. Here a plurality of image portions is sensed during a downward swipe of a fingertip across an imager. A biometric surface is passed across a swipe contact imager and a plurality of image portions are captured at 31. The image portions are assembled into a composite image at 32.

Once the composite image is constructed, an analysis of the image is performed to determine an amount of compression therein at 33. The determined amount of compression is used to estimate N. At step 34, one row is inserted within the image for every N image rows. Thus, the image is increased in vertical direction. By doing so, the feature spacing along the vertical direction—the y axis—is increased to compensate for compressing of the image occurring during image capture. Finally, the corrected composite image is provided at 35.

step 44, one row is inserted within the image for each estimated location wherein a row is to be inserted. Thus, the image is increased in vertical direction. By doing so, the feature spacing along the vertical direction—the y axis—is increased to compensate for compressing of the image occurring during image capture. Finally, the corrected composite image is provided at 45.

Figure 5:
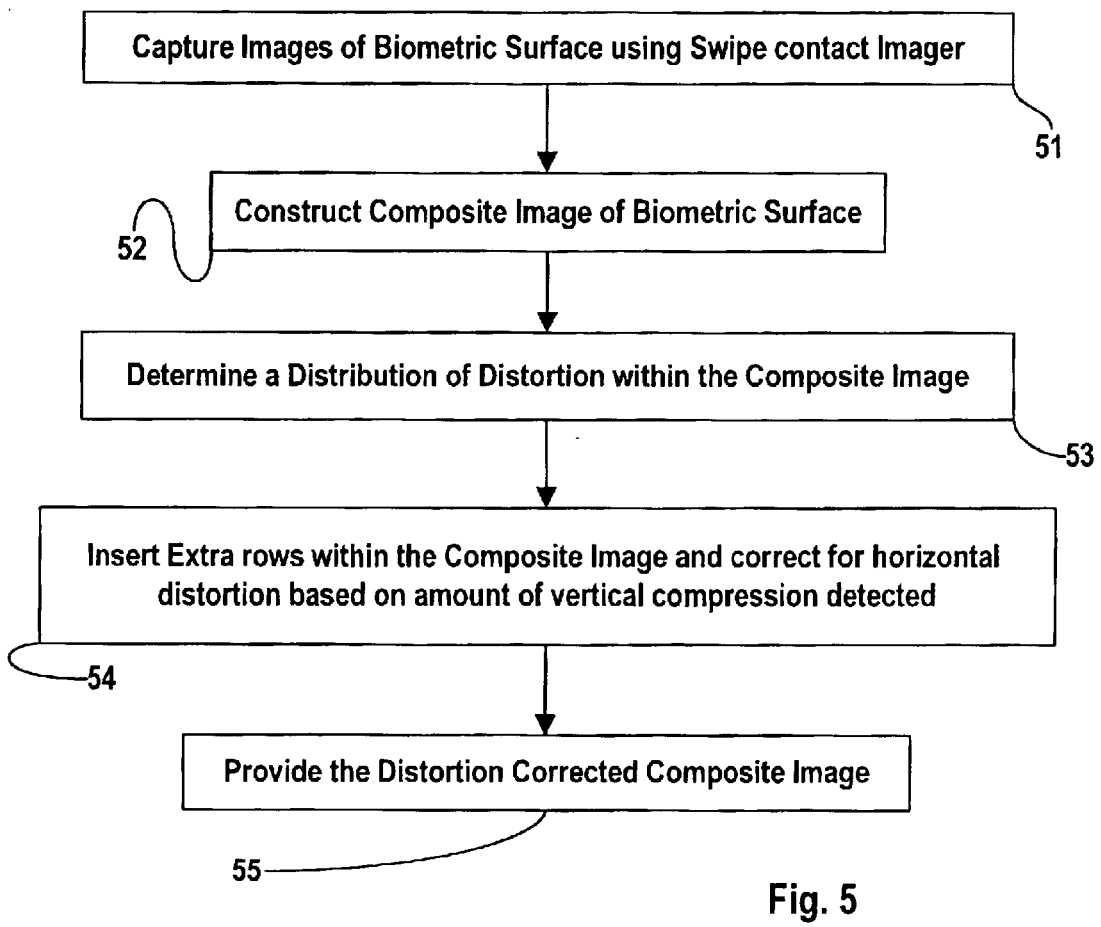
FIG. 5 is a simplified flow diagram of a method of reducing compression related distortion along both the direction of swiping and along a direction orthogonal thereto.

Referring to FIG. 5, a simplified flow diagram of a more complicated method for correcting vertical and horizontal distortion is shown. As is evidenced from the tables 1 and 2, there is a correlation between vertical and horizontal distortion for a sensed downward swiped fingertip. Here a plurality of image portions is sensed during a downward swipe of a fingertip across an imager. A biometric surface is passed across a swipe contact imager and a plurality of image portions are captured at 51. The image portions are assembled into a composite image at 52.

Once the composite image is constructed, an amount of compression therein is determined. For example, an analysis of the image compared to a known image of the same biometric surface is performed to determine an amount of compression therein. Alternatively, the compression is determined based on a measured force applied during sensing of the image of the biometric surface. The amount of compression is then used with further image analysis to determine a distribution of vertical compression within the image and horizontal distortion within the image at 53.

The determined amount of compression is used to estimate where to insert additional rows within the image. At step 54, one row is inserted within the image for each estimated location wherein a row is to be inserted and horizontal distortion compensation is performed. Thus, the image is increased in vertical direction. By doing so, the feature spacing along the vertical direction—the y axis—is increased to compensate for compressing of the image occurring during image capture and distortion along the horizontal axis is compensated for in dependence upon the amount of compression. Finally, the corrected composite image is provided at 55.

Figure 6:
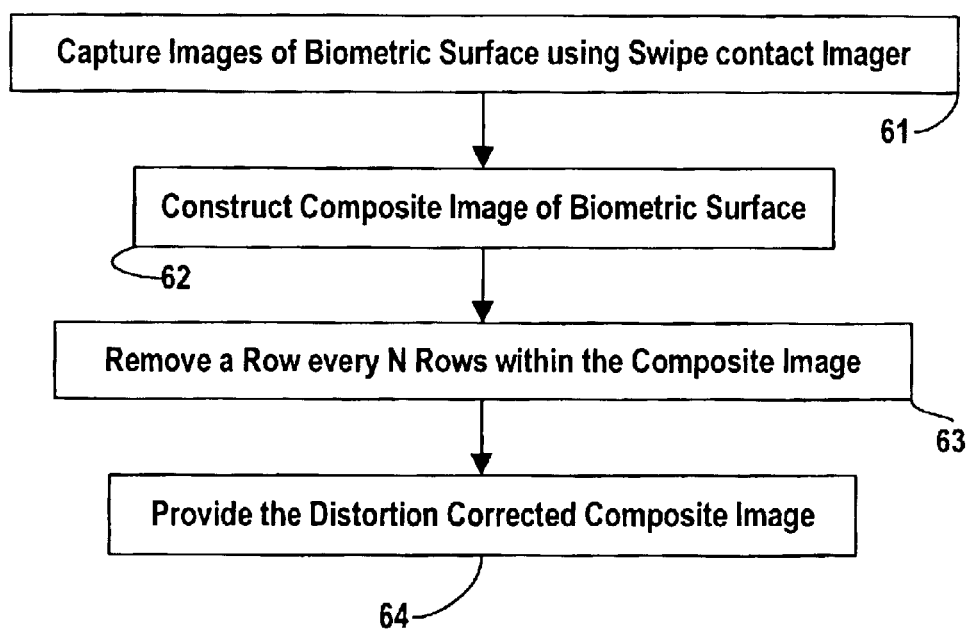
FIG. 6 is a simplified flow diagram of a method of reducing stretching related distortion within some of the images of FIG. 1 according to the invention.

Referring to FIG. 6, a simplified flow diagram of a method for correcting vertical distortion in a swipe image captured with a fingertip moving upward across a swipe contact imager is shown. A biometric surface is passed across a swipe contact imager and a plurality of image portions are captured at 61. The image portions are assembled into a composite image at 62.

Once the composite image is constructed, one row is removed within the image for every N image rows at 63. For example, N=4. Thus, the image is decreased in vertical direction. By doing so, the feature spacing along the vertical direction—the y axis—is decreased to compensate for stretching of the image occurring during image capture. Finally, the corrected composite image is provided at 64.

Figure 7:
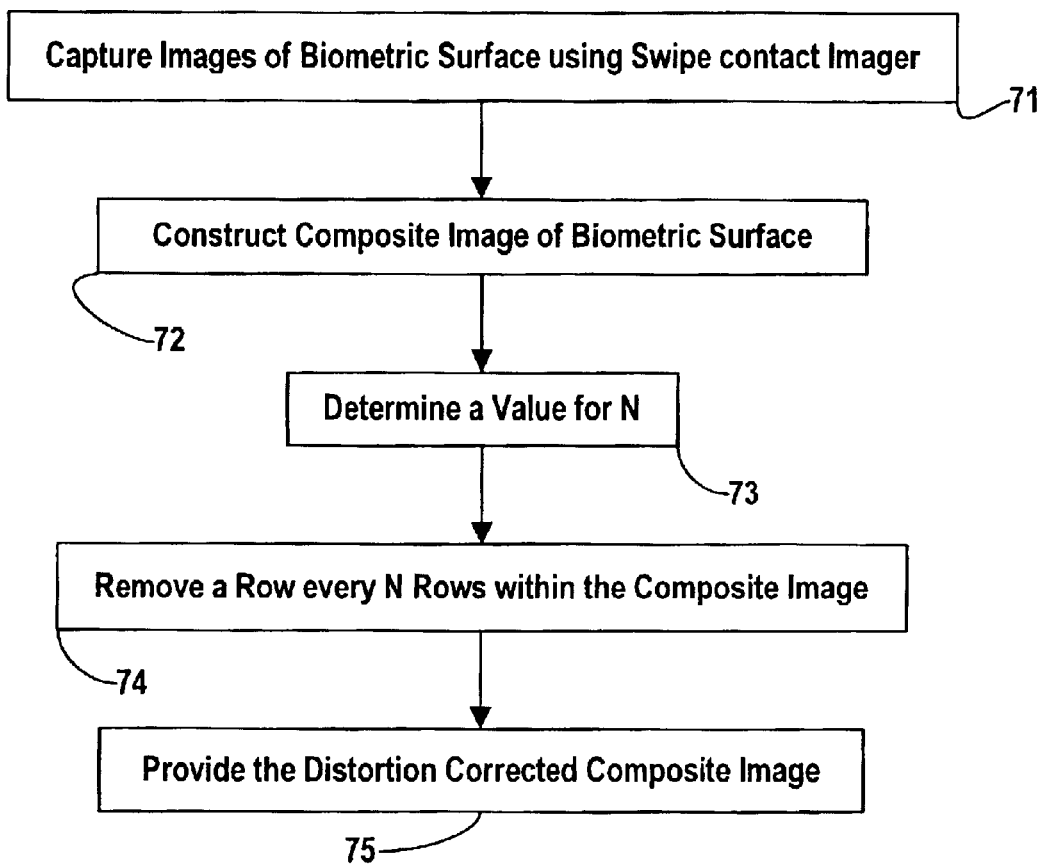
FIG. 7 is a simplified flow diagram of a generalized method of reducing stretching related distortion within some of the images of FIG. 1 according to the invention.

Referring to FIG. 7, a simplified flow diagram of a more complicated but generalized method is shown. Here a plurality of image portions is sensed during an upward swipe of a fingertip across an imager. A biometric surface is passed across a swipe contact imager and a plurality of image portions are captured at 71. The image portions are assembled into a composite image at 72.

Once the composite image is constructed, an amount of stretching therein is determined. For example, an analysis of the image compared to a known image of the same biometric surface is performed to determine an amount of stretching therein. Alternatively, the stretching is determined based on a measured force applied during sensing of the image of the biometric surface. The determined amount of stretching is used to estimate N. At step 74, one row is removed from within the image for every N image rows. Thus, the image is decreased in vertical direction. By doing so, the feature spacing along the vertical direction—the y axis—is decreased to compensate for stretching of the image occurring during image capture. Finally, the corrected composite image is provided at 75.

Figure 8:
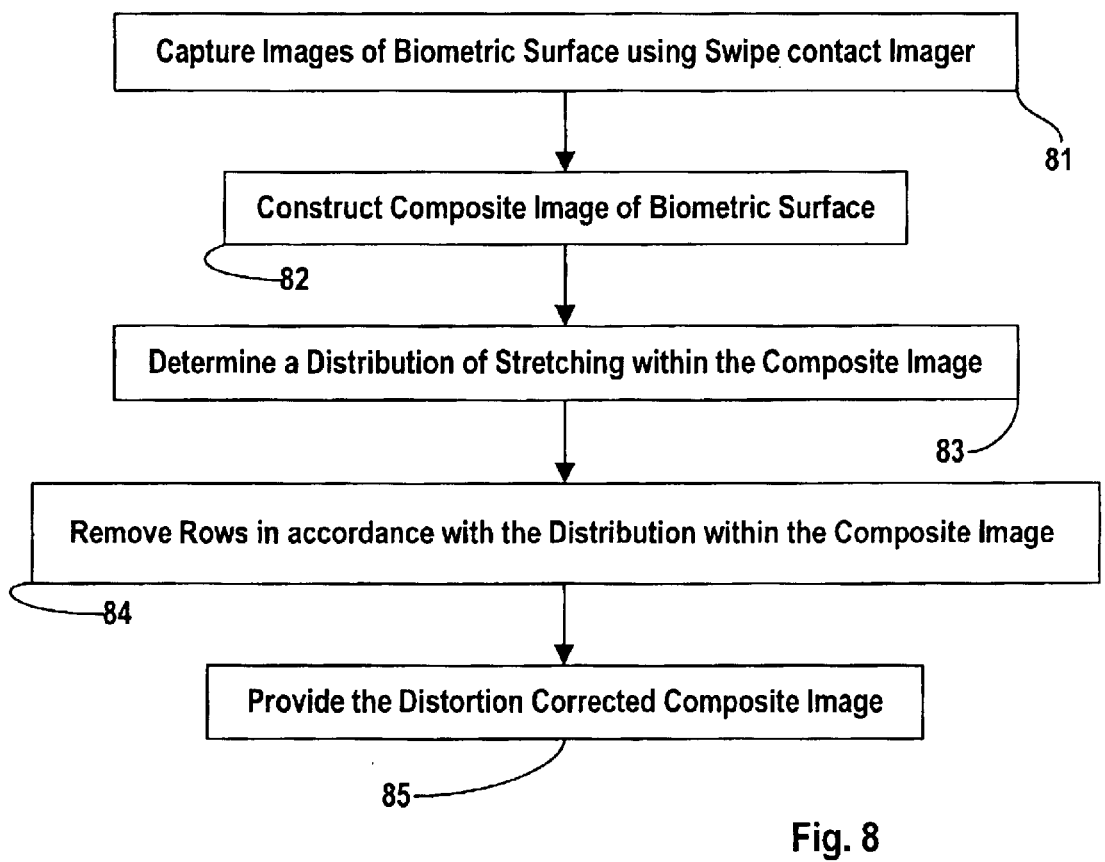
FIG. 8 is a simplified flow diagram of a method of reducing stretching related distortion within some of the images of FIG. 1 according to the invention.

Referring to FIG. 8, a simplified flow diagram of a more complicated but generalized method is shown. Here a plurality of image portions is sensed during an upward swipe of a fingertip across an imager. A biometric surface is passed across a swipe contact imager and a plurality of image portions are captured at 81. The image portions are assembled into a composite image at 82.

Once the composite image is constructed, an amount of stretching therein is determined. For example, an analysis of the image compared to a known image of the same biometric surface is performed to determine an amount of stretching therein. Alternatively, the stretching is determined based on a measured force applied during sensing of the image of the biometric surface. The amount of stretching is then used with further image analysis to determine a distribution of stretching within the image at 83. The distribution may be constant such as 1 in every 4 rows or may be a segmented distribution such as 1 in 3 for the top third and 1 in 5 for the remaining portion of the image. Alternatively, the distribution may be mathematical in nature following a linear or non linear relation with a location within the image.

The determined amount of stretching is used to estimate where to remove extra rows within the image. At step 84, one row is removed from within the image for each estimated location wherein a row is to be removed. Thus, the image is decreased in vertical direction. By doing so, the feature spacing along the vertical direction—the y axis—is decreased to compensate for stretching of the image occurring during image capture. Finally, the corrected composite image is provided at 85.

Figure 9:
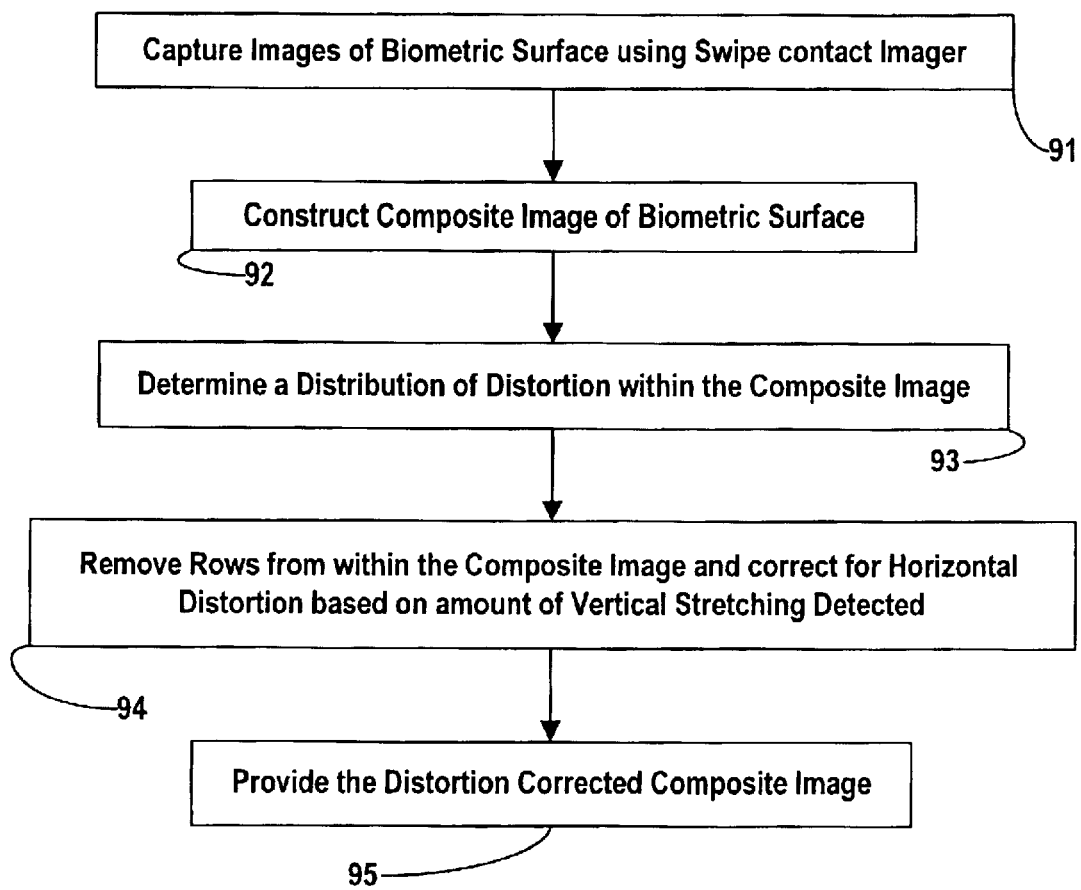
FIG. 9 is a simplified flow diagram of a method of reducing stretching related distortion along both the direction of swiping and along a direction orthogonal thereto.

Referring to FIG. 9, a simplified flow diagram of a more complicated method for correcting vertical and horizontal distortion is shown. Here a plurality of image portions is sensed during an upward swipe of a fingertip across an imager. A biometric surface is passed across a swipe contact imager and a plurality of image portions are captured at 91. The image portions are assembled into a composite image at 92.

Once the composite image is constructed, an amount of stretching therein is determined. For example, an analysis of the image compared to a known image of the same biometric surface is performed to determine an amount of stretching therein. Alternatively, the stretching is determined based on a measured force applied during sensing of the image of the biometric surface. The amount of stretching is then used with further image analysis to determine a distribution of vertical stretching within the image and horizontal distortion within the image at 93.

The determined amount of stretching is used to estimate where to remove rows from within the image. At step 94, one row is removed from within the image for each estimated location wherein a row is to be removed and horizontal distortion compensation is performed. Thus, the image is decreased in vertical direction. By doing so, the feature spacing along the vertical direction—the y axis—is decreased to compensate for stretching of the image occurring during image capture and distortion along the horizontal axis is compensated for in dependence upon the amount of stretching. Finally, the corrected composite image is provided at 95.

Figure 10:
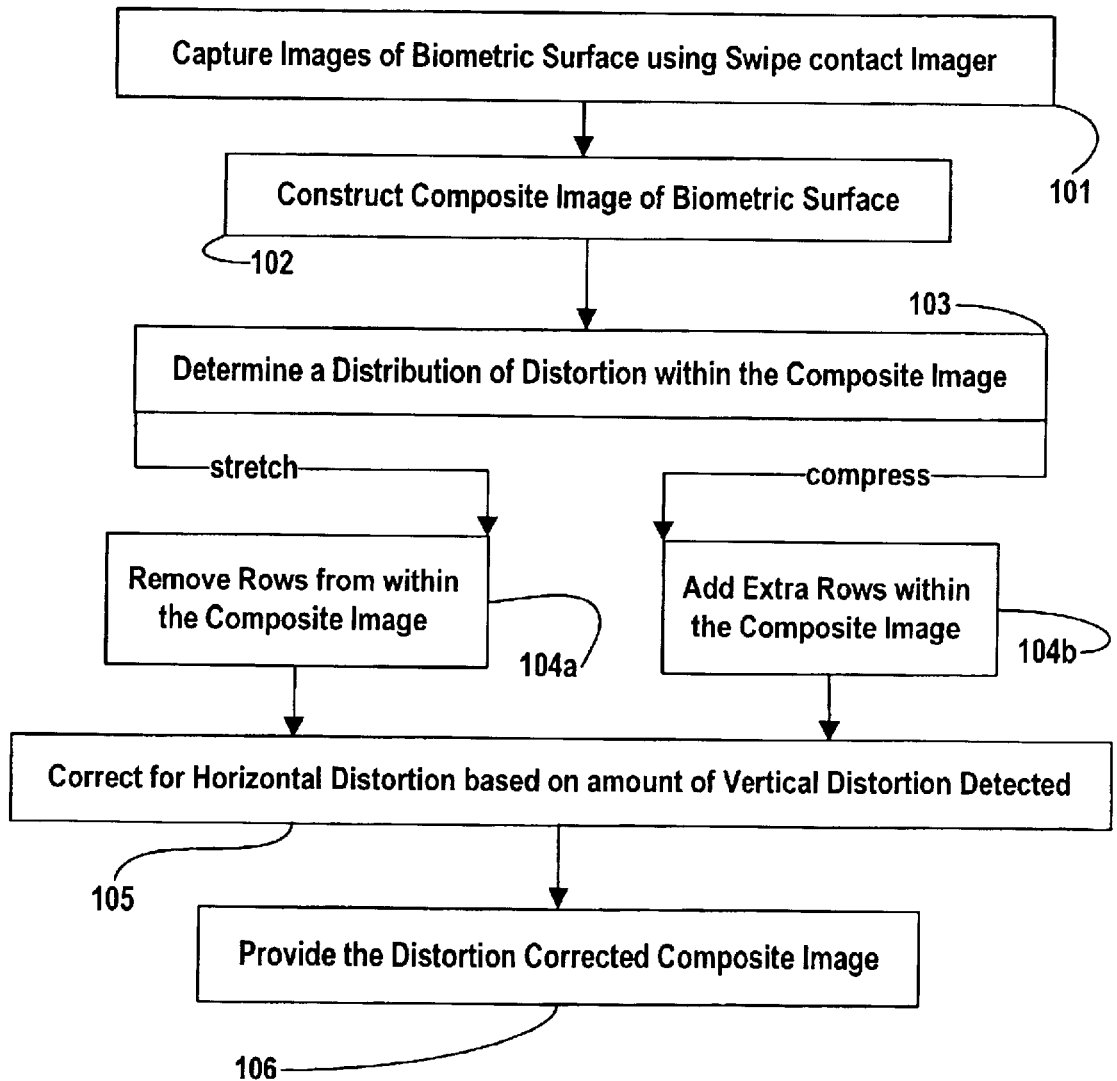
FIG. 10 is a simplified flow diagram of a method of reducing both compression and stretching related distortion along a direction of swiping as well as distortion along a direction orthogonal thereto; and, FIG. 11 is a simplified block diagram of an apparatus for performing the invention.

Referring to FIG. 10, a simplified flow diagram of a more complicated method for correcting vertical and horizontal distortion is shown. Here a plurality of image portions is sensed during a swipe of a fingertip across an imager. A biometric surface is passed across a swipe contact imager and a plurality of image portions are captured at 101. The image portions are assembled into a composite image at 102.

Once the composite image is constructed, an amount of vertical distortion therein is determined. For example, an analysis of the image compared to a known image of the same biometric surface is performed to determine an amount of vertical distortion therein. Alternatively, the vertical distortion is determined based on a measured force applied during sensing of the image of the biometric surface. The amount of stretching or compression is then used with further image analysis to determine a distribution of vertical stretching or compression within the image and horizontal distortion within the image at 103.

The determined amount of vertical distortion is used to estimate whether to add or remove rows and where within the image to do so. At step 104a, one row is removed from within the image for each estimated location wherein a row is to be removed when vertical stretching is detected. Alternatively at step 104b, one row is added within the image for each estimated location wherein a row is to be inserted when vertical compression is detected. At 105, horizontal distortion compensation is performed. Thus, the image is adjusted in vertical direction. By doing so, the feature spacing along the vertical direction—the y axis—is adjusted to compensate for detected vertical distortion of the image occurring during image capture and distortion along the horizontal axis is compensated for in dependence upon the amount of vertical distortion. Finally, the corrected composite image is provided at 106.

Figure 11:
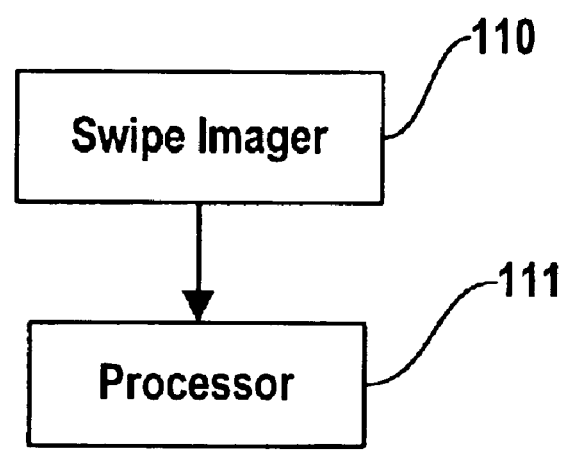

Referring to FIG. 11, a block diagram of an apparatus for performing the invention is shown. The apparatus includes a swipe imager 110 and a processor 111.

Of course, other forms of detectable distortion are compensatable according to the invention as are other forms of distortion highly correlated to detectable forms of distortion. The improvement in the composite image quality for a particular purpose is a function of the biometric surface imaged, the quality of image reconstruction, and the particular purpose.

Numerous other embodiments may be envisaged without departing from the spirit or scope of the invention.

What is claimed is:

1. A method of compensating for distortion within a composite image comprising the steps of:
    sensing a biometric surface with a swipe imager to provide sensed data;
    forming a composite image of the biometric surface from the sensed data; and,
    adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

2. A method according to claim 1 wherein the step of adjusting the composite image includes the step of adding rows interspersed at row intervals within the image.

3. A method according to claim 2 wherein the additional rows are added to compensate for compression of the biometric surface during imaging thereof.

4. A method according to claim 3 wherein the surface is a fingertip and wherein the compression results from a downward swipe direction of the fingertip.

5. A method according to claim 4 wherein a row is added to the composite image for every N rows within the composite image.

6. A method according to claim 5 wherein the rows are added at consistent row intervals.

7. A method according to claim 6 wherein the row interval is 4.

8. A method according to claim 6 including the step of determining a row interval based on an amount of compression within the composite image.

9. A method according to claim 2 wherein a row is added to the composite image for every N rows within the composite image.

10. A method according to claim 9 wherein the rows are added at consistent row intervals.

11. A method according to claim 1 further comprising the steps of:
    determining an amount of compression within the composite image;
    adding lines of image elements within the composite image based on the determined compression; and
    compensating for image distortion along axis orthogonal to the dimension.

12. A method according to claim 11 wherein the step of compensating is performed in dependence upon the determined amount of compression.

13. A method according to claim 11 comprising the step of determining a distribution of the compression within the composite image.

14. A method according to claim 13 wherein the step of adding is performed in dependence upon the determined distribution of the compression within the composite image and the step of compensating is performed in dependence upon the determined amount of the compression within the composite image.

15. A method according to claim 1 further comprising the step of determining a distribution of compression within the composite image.

16. A method according to claim 15 wherein the step of adjusting includes a step of inserting additional lines of elements within the composite image in dependence upon the determined distribution of the compression within the composite image, the lines perpendicular to the dimension.

17. A method according to claim 1 wherein the step of adjusting the composite image includes the step of removing rows interspersed at row intervals within the composite image.

18. A method according to claim 17 wherein the rows are removed to compensate for stretching of the biometric surface during imaging thereof.

19. A method according to claim 18 wherein the surface is a fingertip and wherein the stretching results from an upward swipe direction of the fingertip.

20. A method according to claim 19 wherein a row is removed from the composite image for every N rows within the composite image.

21. A method according to claim 20 wherein the rows are removed at consistent row intervals.

22. A method according to claim 21 including the step of determining a row interval based on an amount of stretching within the composite image.

23. A method according to claim 17 wherein a row is removed from the composite image for every N rows within the composite image.

24. A method according to claim 23 wherein the rows are removed at consistent row intervals.

25. A method according to claim 1 further comprising the steps of:
    determining an amount of stretching;
    removing lines of image elements from the composite image based on the determined stretching; and
    compensating for image distortion along an axis orthogonal to the dimension.

26. A method according to claim 25 wherein the step of compensating is performed in dependence upon the determined amount of stretching.

27. A method according to claim 25 comprising the step of determining a distribution of the stretching within the composite image.

28. A method according to claim 27 wherein the step of removing is performed in dependence upon the determined distribution of the stretching within the composite image and the step of compensating is performed in dependence upon the determined amount of the stretching within the composite image.

29. A method according to claim 16 comprising the step of determining a distribution of stretching within the composite image.

30. A method according to claim 29 wherein the step of adjusting includes a step of removing lines of composite image elements in dependence upon the determined distribution of the stretching within the composite image, the lines perpendicular to the dimension.

31. A method according to claim 1 wherein the step of adjusting comprises the steps of:
 determining whether the composite image is stretched or compressed along the dimension;
 when the composite image is compressed, adjusting the composite image along the dimension to expand the composite image size along said dimension by adding additional image elements along a line perpendicular to said a dimension within the composite image to result in the second composite image with a different number of parallel lines of image elements perpendicular to said dimension; and,
 when the composite image is stretched, adjusting the composite image along the dimension to decrease the composite image size along said dimension by removing image elements along a line perpendicular to said a dimension within the composite image to result in the second composite image with a different number of parallel lines of image elements perpendicular to said at least one dimension therein.

32. A method according to claim 1 further comprising a step of determining an amount of one of compression and stretching along the dimension of the composite image and wherein the step of adjusting the composite image is performed in order to compensate for a determined amount of the one of compression and stretching along said dimension.

33. A method according to claim 1 further comprising a step of determining an amount and distribution of one of compression and stretching along the dimension of the composite image and wherein the step of adjusting the composite image is performed in order to compensate for a determined amount and distribution of the one of compression and stretching along said dimension.

34. A swipe contact imager comprising:
 a platen across which a biometric surface is to be passed for imaging thereof;
 an imaging circuit for sensing a biometric surface passing across the platen and for providing image data relating to portions thereof; and
 a processor for forming a composite image from the image data and for adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

35. A storage medium having stored therein data, the data indicative of instructions for performing the steps of:
 sensing a biometric surface with a swipe imager to provide sensed data;
 forming a composite image of the biometric surface from the sensed data; and,
 adjusting the composite image along a dimension thereof to one of expand or decrease the composite image size along said dimension by one of removing composite image elements along a line perpendicular to said dimension within the composite image and adding additional image elements along a line perpendicular to said dimension within the composite image to result in a second composite image with a different number of parallel lines of composite image elements perpendicular to the dimension therein.

36. A storage medium according to claim 35 wherein the data relating to the step of adjusting the composite image includes data relating to a step of adding rows interspersed at row intervals within the image.

37. A storage medium according to claim 36 wherein the instructions relate to adding a row to the composite image for every N rows within the composite image.

38. A storage medium according to claim 37 wherein the instructions relate to adding the rows at consistent row intervals.

39. A storage medium according to claim 38 wherein the row interval is 4.

40. A storage medium according to claim 38 wherein the data relates to instructions for performing the step of determining a row interval based on an amount of compression within the composite image.

41. A storage medium according to claim 35 wherein the data relates to instructions for performing the comprising the step of:
 determining an amount of compression within the composite image;
 adding lines of image elements within the composite image based on the determined compression; and
 compensating for image distortion along axis orthogonal to the dimension in dependence upon the determined amount of compression.

42. A storage medium according to claim 41 wherein the data relates to instructions for performing the step of determining a distribution of the compression within the composite image.

43. A storage medium according to claim 42 wherein the data relating to instructions for performing the step of adding includes data relating to instructions for performing the step of adding in dependence upon the determined distribution of the compression within the composite image.

44. A storage medium according to claim 35 wherein the data relates to instructions for performing the step of determining a distribution of compression within the composite image.

45. A storage medium according to claim 44 wherein the data relating to instructions for performing the step of adjusting the composite image includes data relating to instructions for performing the step of inserting additional lines of elements within the composite image in dependence upon the determined distribution of the compression within the composite image, the lines perpendicular to the dimension.

46. A storage medium according to claim 35 wherein the data relating to instructions for performing the step of adjusting the composite image includes data relating to instructions for performing the step of removing rows interspersed at row intervals within the composite image.

47. A storage medium according to claim 46 wherein the data relates to instructions for performing the step of determining a row interval based on an amount of stretching within the composite image.

48. A storage medium according to claim 35 wherein the data relates to instructions for performing the steps of:
  determining an amount of stretching;
  removing lines of image elements from the composite image based on the determined stretching; and
  compensating for image distortion along an axis orthogonal to the dimension in dependence upon the determined amount of stretching.

49. A storage medium according to claim 48 wherein the data relates to instructions for performing the step of determining a distribution of the stretching within the composite image.

50. A storage medium according to claim 49 wherein the data relates to instructions for performing the step of removing in dependence upon the determined distribution of the stretching within the composite image and the step of compensating is performed in dependence upon the determined amount of the stretching within the composite image.

51. A storage medium according to claim 45 wherein the data relates to instructions for performing the step of determining a distribution of stretching within the composite image.

52. A storage medium according to claim 51 wherein the data relating to instructions for performing the step of adjusting includes data relating to performing a step of removing lines of composite image elements in dependence upon the determined distribution of the stretching within the composite image, the lines perpendicular to the dimension.

53. A storage medium according to claim 35 wherein the data relating to instructions for performing the step of adjusting include instructions relating to performing the steps of:
  determining whether the composite image is stretched or compressed along the dimension;
  when the composite image is compressed, adjusting the composite image along the dimension to expand the composite image size along said dimension by adding additional image elements along a line perpendicular to said a dimension within the composite image to result in the second composite image with a different number of parallel lines of image elements perpendicular to said dimension; and,
  when the composite image is stretched, adjusting the composite image along the dimension to decrease the composite image size along said dimension by removing image elements along a line perpendicular to said a dimension within the composite image to result in the second composite image with a different number of parallel lines of image elements perpendicular to said at least one dimension therein.

54. A storage medium according to claim 35 wherein the data relates to instructions for performing the step of determining an amount of one of compression and stretching along the dimension of the composite image and wherein the instructions relate to adjusting the composite image is performed in order to compensate for a determined amount of the one of compression and stretching along said dimension.

55. A storage medium according to claim 35 wherein the data relates to instructions for performing the step of determining an amount and distribution of one of compression and stretching along the dimension of the composite image and wherein the instructions relate to adjusting the composite image in order to compensate for a determined amount and distribution of the one of compression and stretching along said dimension.

* * * * *